United States Patent [19]

Ponder, Jr. et al.

[11] Patent Number: 4,819,367
[45] Date of Patent: Apr. 11, 1989

[54] WORM CRADLE BAIT BOX

[76] Inventors: Roland C. Ponder, Jr., Rte. 1, Box 1, Oskaloosa, Kans. 66066; Henry H. Guck, 1405 Apple La., Apt. #12, Lawrence, Kans. 66044

[21] Appl. No.: 172,368

[22] Filed: Mar. 24, 1988

[51] Int. Cl.$^4$ .................. A01K 97/00; A01K 97/04
[52] U.S. Cl. ........................... 43/55; 43/54.1; 43/56
[58] Field of Search .............. 43/55, 56; 206/811, 206/822; 220/367, 369, 370, 372, DIG. 13; 224/199, 235, 920

[56] References Cited

U.S. PATENT DOCUMENTS

| | | | |
|---|---|---|---|
| 503,722 | 8/1893 | Lewis et al. | 43/55 |
| 594,448 | 11/1897 | Webber | 43/55 |
| 886,337 | 5/1908 | Balken | 43/55 |
| 1,619,634 | 3/1927 | Roat | 43/55 |
| 2,849,828 | 9/1958 | Johnson | 43/55 |
| 3,277,599 | 10/1966 | Griffeth | 224/199 |
| 3,380,186 | 4/1968 | Donner | 43/56 |
| 4,260,070 | 4/1981 | Pierson | 43/55 |

FOREIGN PATENT DOCUMENTS 25606 of 1908 United Kingdom ............... 220/369

*Primary Examiner*—Nicholas P. Godici
*Assistant Examiner*—William Scott Andes
*Attorney, Agent, or Firm*—Roland C. Ponder; Henry H. Guck

[57] ABSTRACT

Rotatable worm bait box, comprising a one piece molded rectangular water-tight box which has a single aperture with no permanent lids. The worms will be kept on top of the dirt by a simple 90° one-handed rotation. A single, removable, air-ventilated lid is provided for shipping, if desired.

2 Claims, 1 Drawing Sheet

WORM CRADLE BAIT BOX

BACKGROUND OF THE INVENTION

1. Field of the Invention

The invention related generally to an improved worm bait box which facilitates easier access to worms, prevents leakage and is much less expensive.

2. Description of the Prior Art

At the present time there are several bait box designs on the market which allow the worms to be turned over in the box, thereby exposing the worms for easy access. These designs contain a top and a bottom aperture and lids with clamps, hasps, hinges, or rubber bands to hold the lids on. This is not only awkward and cumersome to handle but is also expensive to construct. They are not water-tight. This would allow moisture and mud leakage because one lid and one aperture is always on the bottom of the box exposing the openings around the lid edges. In addition, when worms are needed the lids must be removed requiring two hands. Finally, there are no air holes to provide oxygen for the worms unless one lid is always off. This requires constant lid removal and reapplication each time the worms settle to the bottom. These designs also require at least four or more separate pieces to construct the final assembly.

To overcome these shortcomings, the present invention is developed with a simple one-piece, water-tight, inexpensive construction with only one aperture and no lids. This prevents leakage and difficult handling problems. Bottom crawling worms are exposed by simply rotating the box 90° with one hand. Also, because of it's strategically placed single aperture worms are always provided with oxygen to sustain longer life. This also provides more vigorous bait. Because of its low cost construction it, along with the lid, could also be used as a worm shipping and storage container. The lid could then be removed and bait could be used with no worm transfers required.

SUMMARY OF THE INVENTION

The invention relates to an improved worm bait box which facilitates easier access to the worms by providing a single aperture which is strategically located and allows access to worms by simply rotating the box 90° to place the worms on top.

Another object of the invention is to provide a bait box with a one piece molded construction, which prevents leakage of water and mud when the box is rotated.

A further object of the invention is to provide a bait box which can be easily operated with one hand, freeing the other hand for other functions.

Still further object of this invention is to provide a less expensive bait box which would provide a broad marketing base. This one-piece molded design contains no lids, hinges, clasps, hasps, or rubber bands. One perforated lid may be included if the box is also used as a shipping or storage container.

Yet another object of the invention is to provide fresh air and yet shade to the worms while they are in the boat, the car, on the dock or pier. The single aperture provides this.

DETAILED DESCRIPTION OF THE INVENTION

Figure 1:
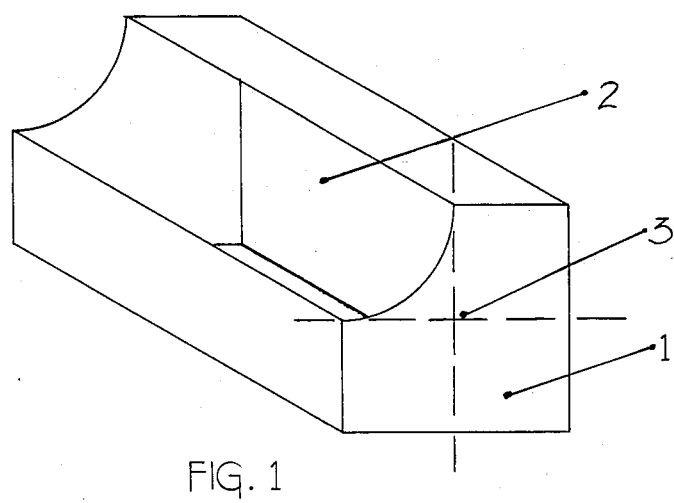
FIG. 1 is a front angular view showing the worm bait box.

Referring to the drawing in FIG. 1 numeral 1 designates a one-piece molded worm bait box. Possible construction materials include plastic or foam moldable material for quick, easy, and inexpensive manufacturing. Numberal 2 indicates the location of the aperture and is shown with no lid as it would be during use. The size of the bait box may vary from 4½" by 4½" by 4½" long to 4½" by 4½" by 8" in length, depending on its use as a bait box or a bait storage container. The opening size will be a 90° arc beginning from the center lines of the end pieces as indicated by numeral 3 and will extend across the entire box from end to end.

Figure 2:
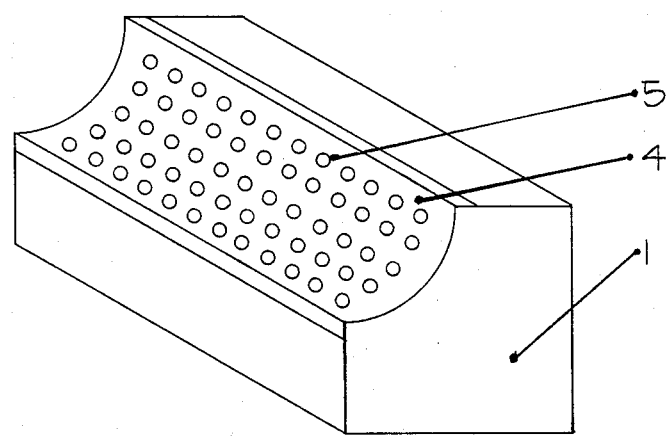
FIG. 2 is the same as FIG. 1 with the exception that a lid is shown installed over the aperture.

FIG. 2 numeral 1 shows the body of the bait box as in FIG. 1. However, the optional plastic lid (numeral 4) is shown installed with a press fit application which allows removal and attachment. Numeral 5 shows the approximate locations of air holes required to preserve bait life. The hole sizes will vary with the size of the bait generally used.

Figure 3:
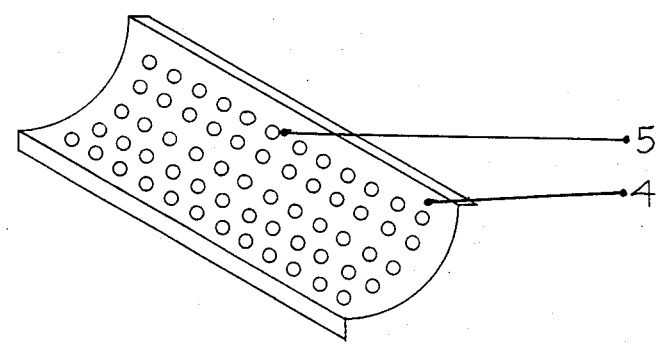
FIG. 3 is the aperture lid.

FIG. 3 numeral 4 is a single view of the aperture lid. Size will depend on the size of the bait box and will be used only when the box is used as a shipping and/or storage container. Lid holes as indicated by numeral 5, will vary in size and location depending on bait size. Lid construction will be molded plastic of a thickness and strength to allow a proper press fit on the bait box itself.

The disclosure of the invention described herein above represents the preferred embodiments of the invention; however, variations thereof in the form, construction, and size, and the modified application of the invention are possible without departing from the spirit and scope of the appended claims.

I claim:

1. A storage container consisting of a rectangular one-piece box with a single opening extending the length of the box substantially along one lengthwise corner, such that the lengthwise edges of the opening extend essentially along the centerline of each of two adjacent lengthwise surfaces of the box, whereby the storage container can be rotated 90° in two directions, with one hand, while maintaining said single opening upwardly opposite the other two lengthwise surfaces of said box, which acts as alternative support surfaces.

2. A live bait storage container consisting of a rectangular one-piece box with a single opening extending the length of the box substantially along one lengthwise corner, such that the lengthwise edges of the opening extend essentially along the centerline of each of two adjacent lengthwise surfaces of the box, whereby the storage container can be rotated 90° in two directions, with one hand, while maintaining said single opening upwardly opposite the other two lengthwise surfaces of said box, which act as alternative support surfaces, and a removable one-piece lid, secured by a press fit, which conforms in size and shape to the dimensions of said single opening and contains a plurality of ventilation holes.

* * * * *